No. 711,379. Patented Oct. 14, 1902.
P. M. BENSETH.
FISH TRAP.
(Application filed Mar. 3, 1902.)
(No Model.) 2 Sheets—Sheet 1.
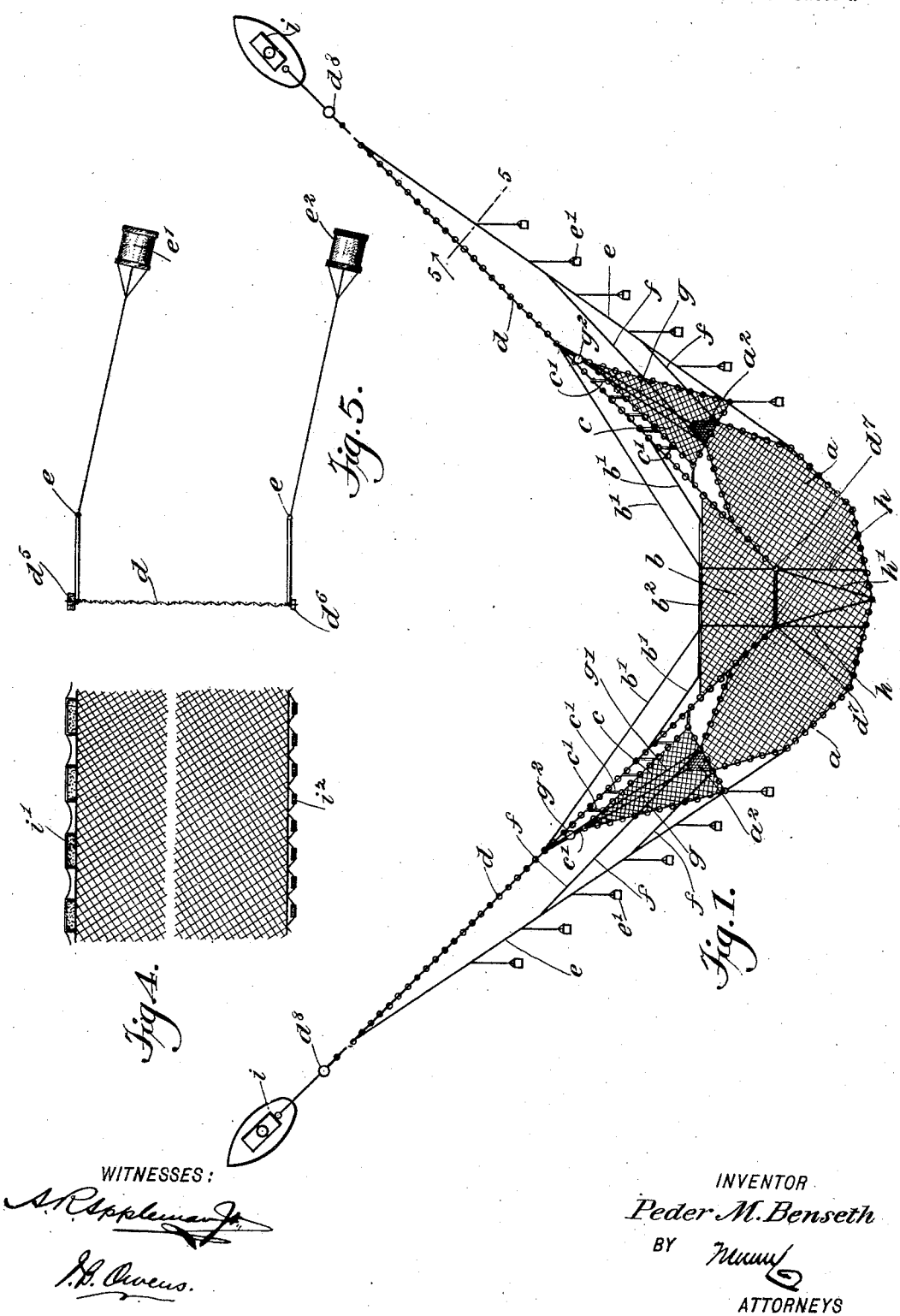
WITNESSES:
INVENTOR
Peder M. Benseth
BY
ATTORNEYS

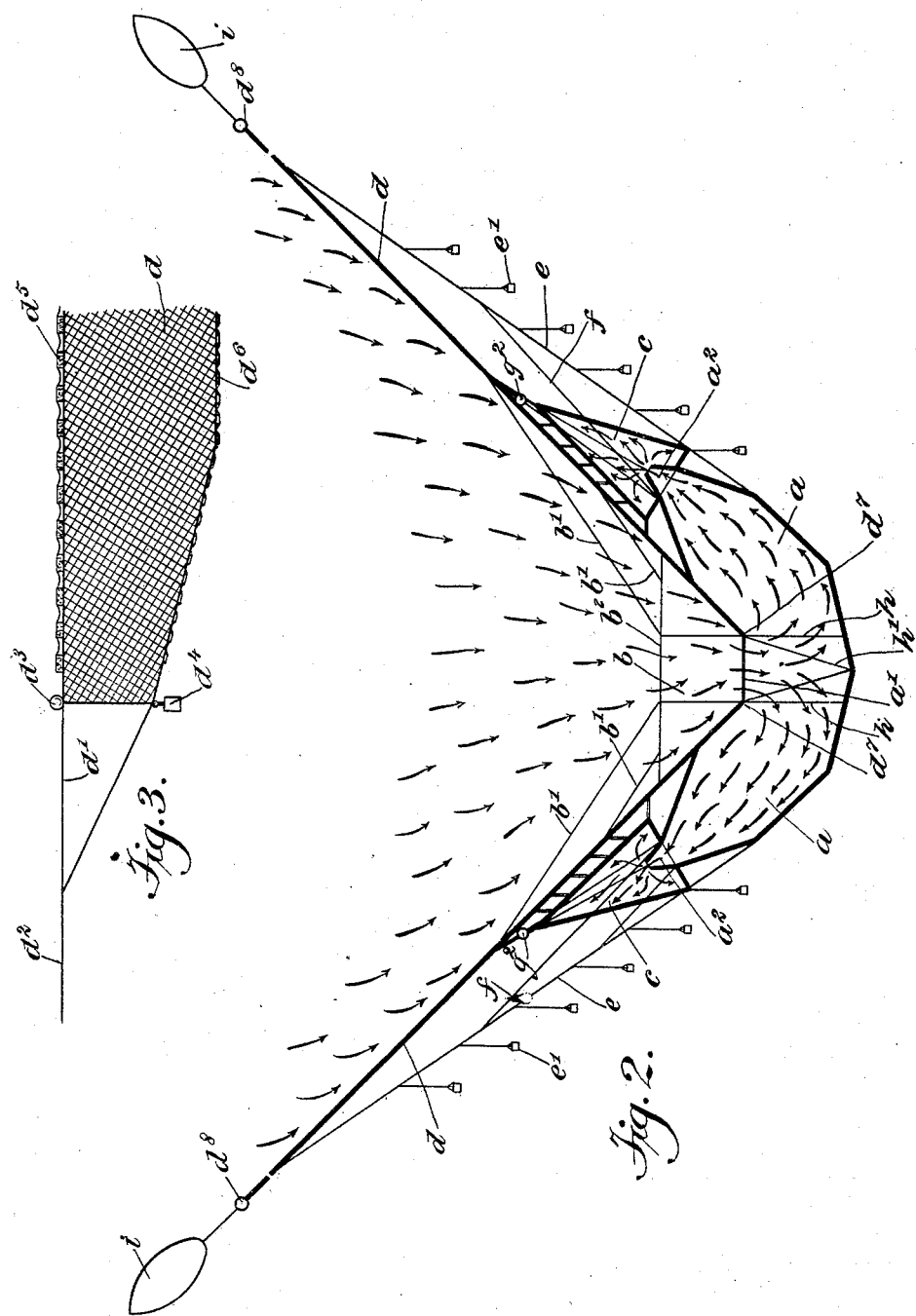

UNITED STATES PATENT OFFICE.

PEDER M. BENSETH, OF FAIRHAVEN, WASHINGTON.

FISH-TRAP.

SPECIFICATION forming part of Letters Patent No. 711,379, dated October 14, 1902.

Application filed March 3, 1902. Serial No. 96,411. (No model.)

*To all whom it may concern:*

Be it known that I, PEDER M. BENSETH, a citizen of the United States, and a resident of Fairhaven, in the county of Whatcom and State of Washington, have invented a new and Improved Fish-Trap, of which the following is a full, clear, and exact description.

This invention relates to a fish-trap adapted to be floated in the water and to be held by tugs or otherwise against the tidal currents, so as to entrap the fish moving with the current.

The invention is designed especially for salmon-fishing, but is useful in other connections, as will be apparent.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a plan view of a trap embodying my invention. Fig. 2 is a diagrammatic view thereof. Fig. 3 is a fragmentary side view of the end of one of the leads. Fig. 4 is a detail view showing the manner of connecting the weights and floats to the webbing. Fig. 5 is a section on the line 5 5 of Fig. 1.
Referring particularly to Fig. 2, $a$ indicates the two parts of a double heart, these parts standing at an obtuse angle to each other and having a single mouth $a'$, below which is located a floor $b$. This floor extends horizontally forward and is adapted to prevent the fish from diving down under the trap as they approach the mouth of the heart.

$c$ indicates the pots into which the parts of the heart respectively lead by means of tunnels $a^2$.

$d$ indicates the two leads, which range at approximately an angle of ninety degrees from each other and which extend from opposite sides of the mouth $a'$ of the heart outward in front of the hearts and pots $c$, and project forwardly and outwardly from the trap to any distance desired.

$i$ indicates tugs or other means for holding the trap stationary against the tidal current or for moving the trap slowly ahead in the absence of a current.

All of the parts $a^2$, $b$, $c$ and $d$ are constructed of netting, so as to retain the fish, and as the trap is floated in the water the fish on striking the leads $d$ will be caused to travel along the same toward the mouth $a'$ of the heart. As they reach this point they will enter the mouth of the heart, since the floor $b$ projects out below them and prevents the fish from diving under the trap.

The leads $d$ constitute the main towing connections of the trap, and, as best shown in Fig. 3, their front ends are connected with a bridle $d'$, these bridles being in turn connected with a tow-line $d^2$ passing to a tug. (Not shown.)

$d^3$ indicates a buoy at the upper edge of the end of the lead, and $d^4$ a weight which keeps the lead properly disposed. The leads are provided along their upper edge with floats $d^5$ and along their bottom with weights $d^6$. The leads extend inward toward the body of the trap and are fastened to the heart at opposite sides of the mouth thereof, the points $d^7$ in Figs. 1 and 2 representing the points at which the leads are attached to the heart of the trap, and these points also representing the side walls of the mouth of the heart.

$d^8$ indicates buoys in the outer ends of the leads to show their positions. The floor $b$ extends along between the two leads, and thus projects slightly forward of the heart.

$b'$ indicates guy-lines which extend from the front edge of the floor to the leads and hold the floor properly disposed. These guy-lines $b'$, acting with a guy-line $b^2$, (see Fig. 2,) prevent the trap from being split should the tugs be moved too far apart. This guy $b^2$ extends from the inner ends of the guy-lines $b'$ transversely across the front edge of the floor $b$, the guy-lines $b'$ extending to the bottom or foot-lines of the leads.

$e$ indicates the main guy-lines of the trap. These guy-lines are arranged two at each side of the trap, and they extend from the top and bottom edges of each lead to the top and bottom portions of the trap at each side thereof. They serve to hold the heart in proper position with respect to the other parts of the trap, and they are provided, as best shown in Fig. 5, with sea anchors or drags $e'$ and $e^2$. The drags $e^2$ are connected with the lower guy-lines $e$ and the drags $e'$ with the upper guy-lines. Of these the drags $e^2$ are provided with metallic hoops or are otherwise weighted, so as to cause them to sink. These sea-anchors trail out behind the trap, as Figs. 1 and 2 show, and they exert a tension on the guy-lines at all times, thus keeping the parts of the trap taut and in proper position.

$f$ indicates guy-lines passing from the main guy-lines $e$ to the heads of the hearts, serving to hold these parts of the hearts in proper position. The guy-lines $f$ are four at each side of the trap, two connected with the top guy $e$ and with the top of the heart and two connected with the bottom guy $e$ and with the bottom of the heart.

The pots $c$ are held in place by fastening them to the leads $d$, this being effected by guy-lines $c'$, which are connected with the top and bottom of the leads and with the top and bottom of the pots and are of sufficient number to hold the pots properly in place, as the drawings show.

$g$ indicates guy-lines for holding the tunnels $a^2$ in position. These guy-lines are two in number and extend from the tunnels to the heads of the respective pots, one guy-line being connected to the top of the tunnel and the other to the bottom and the bottom line running through a block at the bottom of the pot upward to the top thereof to permit convenient manipulation.

$g'$ indicates guy-lines running from the heads of the heart to the lead.

$g^2$ indicates a buoy arranged one at the upper side of each pot to sustain them and also to show the position of the parts of the pot when it is submerged or partly submerged.

$h$ indicates suitable guy-lines in the body of the heart to strengthen it and hold it rigid, and $h'$ indicates a bridle attached to the inner extremities of the leads $d$, to which bridle a boat or scow may be tied and towed along with the trap.

Various other guy-lines and strengthening devices may be employed as may be found necessary without departing from the principle of my invention.

The parts $a$ and $c$ of the trap are constructed of suitable netting and are provided at their bottoms with weights (indicated at $i^2$ in Fig. 4) and at their tops with floats or corks, (indicated at $i'$.) This causes the trap to float properly in water, with its upper edge just level with the surface and with its lower part hanging down perpendicularly from the top of the trap.

If desired, a guy-line may be run between the two tugs to keep them properly distanced, and this guy-line buoyed with floats to keep it from sinking.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. In a floating fish-trap, an inclosure comprising two parts standing at an angle one to the other and having a mouth in the angle of the parts, leads extending from the parts of the inclosure at an angle to each other and adapted to be connected with means for holding the trap in position, a floor-like section extending from the lower part of the mouth of the inclosure, and connections between the floor-like section and leads for supporting the same in position, as set forth.

2. In a floating fish-trap, an inclosure comprising two parts standing at an obtuse angle to each other and having a mouth in the angle of said parts, leads extending from the parts of the inclosure and adapted to be connected with means for holding the trap in position, a floor-like section extending from the lower part of the mouth of the inclosure, and guy-lines connecting the floor-like section with the leads, as set forth.

3. In a floating fish-trap, an inclosure comprising two parts standing at an obtuse angle to each other and having a mouth in the angle of said parts, leads extending from opposite sides of the mouth of the inclosure and adapted to be connected with means for holding the trap in position, a floor-like section projecting from the lower part of the mouth of the inclosure and extending between the leads, and guy-lines extending from the front edge of the floor-like section to the leads, as set forth.

4. In a floating fish-trap, an angular inclosure, leads attached to said inclosure and projecting out therefrom toward opposite sides, the mouth of the inclosure being in the angle thereof and directly adjacent to the inner ends of the leads and the leads being adapted to be connected with means for holding the trap in the proper position, and a floor-like section of netting projecting out horizontally from the lower part of the mouth of the inclosure and extending between and connected with the leads, for the purpose specified.

5. A floating fish-trap, comprising an angular inclosure, leads attached to said inclosure and projecting out therefrom toward opposite sides, the mouth of the inclosure being in the angle thereof and directly adjacent to the inner ends of the leads and the leads being adapted to be connected with means for holding the trap in the proper position, a floor-like section of netting projecting out horizontally from the lower part of the mouth of the inclosure and connected with the leads, for the purpose specified, guy-lines connecting the front end of the floor-like section with the leads and guy-lines extending from the leads to the rear parts of the inclosure and provided with drags.

6. A floating fish-trap, comprising a heart with an opening at its front portion, the heart having two parts projecting from opposite sides thereof, a pot in communication with the end of each part of the heart, a lead connected with each part of the heart at opposite sides of the opening thereof, the leads extending forwardly and outwardly from the trap, and connections between the pots and the leads.

7. A floating fish-trap, comprising a heart with an opening at its front portion, the heart having two parts projecting from opposite sides thereof, a pot in communication with the end of each part of the heart, a lead connected with each part of the heart at opposite sides of the opening thereof, the leads extending forwardly and outwardly from the trap, connections between the pots and the leads, and guy-lines extending between the leads and the rear part of the heart.

8. A floating fish-trap, comprising a heart with an opening at its front portion, the heart having two parts projecting from opposite sides thereof, a pot in communication with the end of each part of the heart, a lead connected with each part of the heart at opposite sides of the opening thereof, the leads extending forwardly and outwardly from the trap, connections between the pots and the leads, a floor-like section of netting projecting forwardly from the bottom of the mouth of the heart, and means for holding each section of the netting in place, such means extending to the lead.

9. A floating fish-trap, comprising a two-part heart with a mouth at its front, a pot communicating with the head of each part of the heart, two leads connected with the front part of the heart respectively at the sides of the mouth thereof and projecting forwardly and outwardly therefrom in front of the pots, connections between the leads and the pots to hold the pots in proper position, main guy-lines extending from the leads to the rear part of the heart, and auxiliary guy-lines extending from the heads of the heart to the main guy-lines.

10. A floating fish-trap, comprising a two-part heart with a mouth at its front, a pot communicating with the head of each part of the heart, two leads connected with the front part of the heart respectively at the sides of the mouth thereof and projecting forwardly and outwardly therefrom in front of the pots, connections between the leads and the pots to hold the pots in proper position, main guy-lines extending from the leads to the rear part of the heart, auxiliary guy-lines extending from the heads of the heart to the main guy-lines, a floor-like section of netting projecting forwardly from the mouth of the heart to the bottom thereof, and guy-lines for holding said section of floor-like netting in place, the guy-lines extending to the leads.

In testimony whereof I have signed my name to this specification in the presence of two subscribing witnesses.

PEDER M. BENSETH.

Witnesses:
  T. F. BEVANS,
  EDWIN R. SHERMAN.